3,307,960
COMPOSITE COPPER PHTHALOCYANINE PIGMENTS
Adrian R. Pitrot, Uniondale, N.Y., assignor to National Lead Company, New York, N.Y., a corporation of New Jersey
No Drawing. Filed May 24, 1963, Ser. No. 282,852
6 Claims. (Cl. 106—288)

This invention relates to novel copper phthalocyanine pigments. In particular, this invention relates to coated copper phthalocyanine pigments and to a process for preparing the same.

Copper phthalocyanines have long been known as one of the best blue and green pigments by reason of their purity and depth of color. Their introduction into paints, enamels, plastics, rubber, etc., have provided outstanding tinting strength along with exceptional resistance to weathering and the deteriorating influences of sunlight, airborne chemicals and the like. Notwithstanding their highly desirable properties, extensive utilization of these pigments have not been forthcoming in view of their prohibitive cost, as compared to other similarly colored pigments, which militated against their use in many applications for which their pigmentary properites would otherwise render them admirably suited.

Heretofore, when it was desired to make full use of the intense chroma of the phthalocyanine pigment, rather than blending it with a white pigment or the like to lighten it to a pale tint, it was found that the amount of phthalocyanine pigment required to produce the desired color tone was not sufficient to impart the proper consistency and viscosity to the conventional vehicles without the addition of further solids. To provide the proper consistency there were added additional solids, either in the form of additional amounts of phthalocyanine pigments, which proved too costly to be of practical value, or in the form of additions of non-pigmentary filler materials such as clay, silica, chalk or the like, which seriously reduced the brilliant effect provided by the pigment.

It has been found that these disadvantages can be overcome by more efficient utilization of the copper phthalocyanine inasmuch as in a pigment particle consisting entirely of copper phthalocyanine, only the surface of each particle is utilized in coloring, the core of the particle contributing little or nothing to the color of paint films, plastics, rubber, textiles, inks and the like.

An object of this invention therefore, is to provide a coated copped phthalocyanine pigment. Another object is to provide a silica-cored organometallic coated pigment. Another object is to provide a pigment containing a substantial proportion of silica without the normal deleterious effects of such silica on the pigment properties. A further object is to provide a more economical copper phthalocyanine particle of good quality. A yet further object is to provide a process for the preparation of a silica-cored copper phthalocyanine particle. Another object is to provide elastomer and paint compositions containing a silica-cored copper phthalocyanine pigment. Other objects and advantages will become apparent from the following more complete description and claims.

Broadly, this invention contemplates a new composition of matter comprising a silica particle coated with copper phthalocyanine. This invention also contemplates an elastomer composition comprising as pigment therefor, particles of silica coated with copper phthalocyanine. This invention also contemplates a paint composition comprising as pigment therefor, particles of silica coated with copper phthalocyanine. This invention further contemplates a process for the manufacture of a silica-cored copper phthalocyanine particle which comprises the steps of froming an admixture of finely-divided silica with urea, a phthalic acid derivative and a cupreous reagent under an inert atmosphere, heating this admixture and forming in situ a copper phthalocyanine coating on said silica. In a particularly desirable embodiment, this invention contemplates a process for the manufacture of a silica-cored copper phthalocyanine particle wherein a catalyst is present along with the finely-divided silica and the reactants. In a highly preferred embodiment, the catalyst is first coated on the finely-divided silica and thereafter contacted with the reactants.

The compositions contemplated by this invention comprises particles of silica having a coating thereon of copper phthalocyanine. The proportion of silica should be from 90% to 50% based on the total weight of the composite particle. Composite particles containing greater than 90% silica show limited effectiveness as pigments because of insufficient coating whereas particles containing less than 50% silica yield products that are more expensive without a compensating increase in effectiveness. For paint or other pigmentary purposes it is preferred to have from about 20% to 40% coating of copper phthalocyanine as this range produces the most desirable pigments.

The compositions contemplated by this invention may be prepared by reatcing a phthalic acid derivative, such as phthalic anhydride, with urea and a cuperous material in the presence of finely-divided silica.

The silica utilized as the pigment core may be any finely-divided silica, preferably having an average particle size of from about 1 to about 10 microns in diameter and may be prepared by precipitation from a silicate solution, by ignition of organosilica compounds, by combustion of volatile compounds such as $SiCl_4$ or in other ways which will be obvious to those skilled in the art. For economy and simplicity, however, we prefer to employ finely-divided native silica.

To the finely-divided silica there is added a phthalic acid derivative, urea and a cupreous reagent which is thereafter thoroughly mixed. Any order of addition has been found to give satisfactory results. As phthalic acid derivatives we mean to include not only phthalic acid and phthalic anhydride but also mono-, di-, and tri-halogen phthalic acids and their derivatives, and the nitrophthalic acids and their derivatives. The term phthalic acid derivatives is also meant to include naphthalene dicarboxylic acids, the benzene-tri and tetra carboxylic acids, mellitic acid, phthalimide, phthalamide, ortho-cyanobenzoic acid, phthalimimide and combinations of the above. Preferably an inorganic copper salt, such as a halide, sulfate, etc., is employed as a source of copper for the pigment; however, other copper compounds such as copper oxides and copper metal may be employed. Specifically, a copper halide such as copper chloride is preferred.

The reaction is conveniently carried out in the absence of solvents or diluents; however, any well known diluent such as trichlorobenzene, kerosene, ortho-dichlorobenzene or the like may be used as a reaction medium. The blended mass is then reacted under an inert atmosphere, such as under nitrogen or carbon dioxide, at a temperature of from 180° C. to 240° C. for a period of from 1 to 4 hours.

At the completion of the reaction, the pigment is removed or if a reaction diluent has been employed the pigment is isolated by filtration, decantation, distillation or the like. The isolated pigment is thereafter disagglomerated, for example, by hammer milling or by grinding the pigment in a pebble mill in the presence of water.

In carrying out the synthesis of copper phthalocyanine, we react, for example, about 4 to 10 mols of phthalic anhydride with about 15 to 16 mols of urea and from about 0.9 to 1.1 mols of copper chloride. It is not necessary to adhere to the above ratios inasmuch as the amount of urea may be increased without appreciably affecting the reaction. In fact, excess urea, if desired, may be used as a reaction medium in place of the above-mentioned diluents.

In a preferred method of operation, a catalyst is utilized as an adjuvant to the formation of the copper phthalocyanine. Any of the catalysts known to increase the rate of formation of copper phthalocyanine may be employed, including alkali metal molybdates, ammonium molybdate, boric acid, ferric chloride, stannous chloride, and compounds of phosphorus, vanadium, arsenic, selenium, antimony, tungsten, and bismuth. Preferably the alkali metal molybdates and ammonium molybdate are employed.

When employing a catalyst, it may be present in a dispersed form among the reactants and finely-divided silica. The catalyst level employed is from about 0.25% to 2% catalyst based on the weight of silica employed. In a highly preferred manner of operation, the catalyst is coated onto the silica prior to the in situ formation of the copper phthalocyanine. The catalyst coated silica is conveniently prepared by treating finely-divided silica with an aqueous solution of the catalyst. The catalyst coating on the silica, for example, a molybdate, is preferably between 0.25 and 2% molybdate based on the weight of the silica. This coating can be achieved by slurrying the silica, for example, in a 5–20% alkali molybdate aqueous solution, and drying the slurry. Preferably, this product is thereafter calcined at a temperature ranging from about 300 to 750° C. for 1 to 2 hours. The catalyst coated silica provides an advantageous method of operation in that it shortens the reaction time needed for the in situ formation of the copper phthalocyanine on the silica core. It further provides the silica-cored particles with a higher percent coating in shorter periods of time, making for a most efficient process. Whether or not any catalyst remains in the copper phthalocyanine coated particle is immaterial inasmuch as it does not affect the performance of the product.

The term silica-cored copper phthalocyanine as herein employed is intended to be understood as a generic term applicable not only to the pure unsubstituted compound possessing a brilliant blue coloring but also to chlorinated copper phthalocyanines which produces brilliant green pigments. As the degree of chlorination of the benzene nuclei are increased, there will result a gradual greening of the blue shade until 12 or more chlorine atoms are introduced wherein a definite green is attained. In place of chlorine other halogens such as bromine or iodine may be substituted. The benzene nuclei may also be modified by preparing other derivatives such as sulfonated and hydrogenated silica-cored copper phthalocyanines.

The product recovered after the in situ sythesis of the pigment on the silica and disagglomeration is characterized by a blue color with grey undertones. This product provides an inexpensive blue pigment useful in many applications, such as in paints, plastics, rubber, etc. Where a brilliantly colored pigment is preferred, the product may be further treated to eliminate the greyish tint by an acid pasting operation. By acid pasting we means the formation of a silica-cored copper phthalocyanine and 70–100% sulfuric acid slurry that is mixed for a period of 15 to 60 minutes at a temperature of from 20° C. to 50° C. In place of sulfuric acid we can effectively utilize other acids such as phosphoric, chloracetic, chlorsulfonic and alkyl sulfonic acids. Thereafter this slurry is diluted with water, stirred, filtered and washed until the pulp is acid free. Upon disagglomeration a brilliantly colored silica-cored pigment is recovered.

In order to more fully illustrate the nature of this invention and the manner of practicing the same, the following examples are presented:

*Example I*

1070 grams of finely-divided silica was slurried in 1200 ml. of water (for 1 hour). Thereafter 5.35 grams of sodium molybdate was added as a 20% solution, stirred for ½ hour, dried and the catalyst coated silica calcined at 750° C. for 2 hours. This product was found to be silica coated with 0.5% sodium molybdate.

200 grams of the above-prepared silica coated catalyst was thereafter thoroughly mixed with 140 grams of urea, 90 grams of phthalic anhydride and 20 grams of copper chloride, reacted for 2 hours under a nitrogen atmosphere at a temperature of 220° C., cooled and ground in a pebble mill with 945 ml. of water for 16 hours. After milling, the charge was further diluted with water so as to give a total volume in milliliters equal to 15 times the weight of sample in grams, and this slurry was heated to 90° C. and filtered. The material was then repulped three times with hot water and dried. A yield of 283.6 grams of product calculated at 69.5% $SiO_2$ and 30.5% copper phthalocyanine was recovered. This coated pigment was characterized by a blue color with a greyish tint.

This product was thereafter acid pasted in the following manner: 800 grams of the silica-cored copper phthalocyanine was added to 3,450 grams of 70% sulfuric acid solution at 25° C. The pigment was stirred for 1 hour, poured into 8 liters of water, heated to boiling with stirring for 1 hour, filtered, repulped 6 times each with 8 liters of water until the acid was removed, dried and hammer milled through a 1/16 inch screen. This acid pasted product possessed a brilliant blue color with reddish tint. 95% of the weight of the product was recovered after acid pasting.

The product was then compared to a commercial copper phthalocyanine (Ramapo Blue FR resinated) in flexible vinyl plastic compositions at concentrations adjusted to give equal amounts by weight of the coloring pigment. The plastic composition was composed of 100 parts by weight of a polyvinyl chloride resin (Geon 101), 50 parts by weight of DOP, 5 parts by weight of lead silicate and 0.96 part by weight of actual coloring pigment. Sheets having thicknesses of 40 mils were milled and molded from the above compositions. Results of mass tone studies showed the compositions containing the pigment of the instant invention to be colored a dark blue as compared to blue with the commercial material, thereby demonstrating a more efficient use of the coloring material.

Similarly, tinted plastic compositions, as described above, with the addition of 5 parts by weight of $TiO_2$ were evaluated for electrical volume resistivity at 70° C. The composition containing the instant invention had a resistivity of $1.93 \times 10^{12}$ ohm-cm. as compared to $1.17 \times 10^{12}$ ohm-cm. for the commercial material. The results indicate that the coated pigment is admirably suited for coloring electrical insulation. Also, exposure of the composition to temperatures of 375° F. for a prolonged period showed good heat stability. Further, it was found that the coated pigment had better dispersion than the commercial material.

*Example II*

1070 grams of finely-divided silica was slurried in 1200 ml. of water for 1 hour. Thereafter 5.35 grams of sodium molybdate was added as a 20% solution, stirred for ½ hour and dried. This product was found to be silica coated with 0.5% sodium molybdate.

200 grams of the above-prepared silica coated catalyst was mixed with 140 grams of urea, 90 grams of phthalic anhydride and 20 grams of copper chloride, reacted, recovered and acid pasted in a manner identical with Example I. The recovered silica-cored copper phthalocyanine pigment possessed a brilliant blue color.

Example III 1070 grams of finely-divided silica was slurried in 1200 ml. of water for 1 hour. Thereafter 21.4 grams of sodium molybdate was added as a 20% solution, stirred for ½ hour, dried and calcined at 750° C. for 2 hours. This product was found to be silica coated with 2% sodium molybdate.

100 grams of the above prepared silica coated catalyst was thereafter thoroughly mixed with 45 grams of urea, 45 grams of phthalic anhydride and 10 grams of copper chloride, reacted for 1 hour under a nitrogen atmosphere at a temperature of 220° C., cooled and ground in a pebble mill with 420 ml. of water for 16 hours. After milling, the charge was further diluted with water so as to give a total volume in milliliters equal to 15 times the weight of sample in grams, and this slurry was heated to 90° C. and filtered. The material was then repulped three times with hot water and dried. A yield of 130.5 grams of a product calculated at 75% $SiO_2$ and 25% copper phthalocyanine was recovered. This coated pigment was characterized by a blue color with a greyish tint.

Example IV 100 grams of silica having a 0.5% sodium molydate coating calcined at 750° C. was mixed with 70 grams of urea, 45 grams of phthalic anhydride, and 10 grams of copper chloride, reacted for 1 hour under a nitrogen atmosphere at a temperature of 220° C., cooled, and ground in a pebble mill with 472 ml. of water for 16 hours. After milling, the charge was further diluted with water so as to give a total volume in milliliters equal to 15 times the weight of sample in grams, and this slurry was heated to 90° C. and filtered. The material was repulped 3 times with hot water and filtered. A yield of 142.6 grams of a product calculated at 68.9% silica and 31.1% copper phthalocyanine was recovered. This coated pigment was characterized by a blue color with a greyish tint.

Example V 1070 grams of finely-divided silica was slurried in 1200 ml. of water for 1 hours. Thereafter 2.67 grams of sodium molybdate was added as a 20% solution, stirred for ½ hour, dried and calcined at 750° C. for 2 hours. This product was found to be silica coated with 0.25% sodium molybdate.

100 grams of silica having a 0.25% sodium molybdate coating was mixed with 45 grams of urea, 45 grams of phthalic anhydride and 10 grams of copper chloride, reacted for 1 hour under a nitrogen atmosphere at a temperature of 220° C., cooled, and ground in a pebble mill with 420 ml. of water for 16 hours. After milling, the charge was diluted with 3,375 milliliters of water, heated to 90° C. and filtered. The material was repulped 3 times with hot water and filtered. A yield of 130.8 grams of a product calculated at 74.9% silica and 25.1% copper phthalocyanine was recovered.

Example VI 100 grams of silica was mixed with 45 grams of urea, 45 grams of phthalic anhydride and 10 grams of copper chloride, reacted for 1 hour under a nitrogen atmosphere at a temperature of 220° C., cooled, ground and recovered as in Example V. A yield of 107.7 grams of a product calculated from ignition loss to be 85% silica and 15% copper phthalocyanine was recovered.

Example VII 10 pounds of finely-divided silica was slurried in 2900 ml. of water for 1 hour. Thereafter 129.3 grams of sodium molybdate was added as a 20% solution, stirred for ½ hour, dried and calcined at 750° C. for 2 hours.

700 grams of the above-prepared catalyst coated silica was mixed with 490 grams of urea, 315 grams of phthalic anhydride and 70 grams of copper chloride, reacted for 2 hours under a carbon dioxide atmosphere at a temperature of 220° C., cooled and ground with 1050 ml. of water for 16 hours. After milling, the charge was further diluted with water so as to give a total volume in milliliters equal to 15 times the weight of the sample in grams, heated to 90° C., filtered, dried and milled through a ⅟₁₆ inch screen. This product was thereafter acid pasted as in Example I, dried and milled through a ⅟₁₆ inch screen. The silica-cored product had a calculated composition corresponding to 73% silica and 27% copper phthalocyanine.

This pigment was formulated into enamel paints and compared to commercial Phthalocyanine Blue, Prussian Blue and Ultramarine Blue pigments. Cedar panels measuring 7¼₄″ x 11″ were first given a standard primer coat and then one coat of the paints found in Tables I and II.

FORMULATION OF ENAMEL PAINTS

TABLE I

| | Control 1, lbs./100 gal. | Control 2, lbs./100 gal. | Control 3, lbs./100 gal. | Test 1, lbs./100 gal. |
|---|---|---|---|---|
| Pigment Composition: | | | | |
| Phthalocyanine Blue | 223.7 | | | |
| Prussian Blue | | 232.2 | | |
| Ultramarine Blue | | | 240.2 | |
| Copper phthalocyanine coated silica | | | | 240.4 |
| Vehicle Composition: | | | | |
| Alkyd Resin (Aroplaz 1266-70) | 447.4 | 481.1 | 408.4 | 480.7 |
| Mineral Spirits | 168.2 | 180.8 | 180.6 | 180.7 |
| 6% Co. naphthenate | 2.2 | 2.4 | 2.4 | 2.3 |

TABLE II

| | Control 4, lbs./100 gal. | Control 5, lbs./100 gal. | Control 6, lbs./100 gal. | Test 2, lbs./100 gal. |
|---|---|---|---|---|
| Pigment Composition: | | | | |
| $TiO_2$ | 239.4 | 226.6 | 227.5 | 227.5 |
| Phthalocyanine Blue | 26.6 | | | |
| Prussian Blue | | 25.2 | | |
| Ultramarine Blue | | | 25.3 | |
| Copper phthalocyanine coated silica | | | | 25.3 |
| Vehicle Composition: | | | | |
| Alkyd Resin (Aroplaz 1266-70) | 501.6 | 503.6 | 505.5 | 505.5 |
| Mineral Spirits | 188.6 | 189.3 | 190.0 | 190.0 |
| 6% Co. naphthenate | 2.5 | 2.5 | 2.5 | 2.5 |

The alkyd resin is a long oil soya alkyd.

The painted panels were exposed outdoors at 45° south. The panels painted with the copper phthalocyanine coated silica pigments after an extended exposure period of many months were found to possess better gloss retention, general appearance and resistance to fading than the control paints containing the commercial pigments. A most important result was the "Bronzing" resistance of the paints containing the silica-cored pigments. By "Bronzing" we mean a darkening and reddening of the paint film along with the acquisition of a metallic luster. After 6 months exposure, the panels painted with the commercial copper phthalocyanine developed "Bronzing" whereas the panels painted with the silica-cored pigment even after longer periods of exposure were free from "Bronzing."

The foregoing examples illustrate specific embodiments of the instant invention. The paint and elastomer compositions employing the novel pigments are merely illustrative of the wide variety capable of being utilized. A large selection of resins, vehicles, active pigments, extender pigments, etc., may also be employed in these compositions as will be understood by those skilled in the art.

While this invention has been described and illustrated by the examples shown, it is not intended to be strictly limited thereto and other modifications may be employed within the limits of the following claims.

I claim:

1. A new composition of matter consisting essentially of a silica particle coated with copper phthalocyanine.

2. A pigmentary composition consisting essentially of particles of silica coated with copper phthalocyanine, said silica being present from about 90% to 50% based on the total weight of the particles.

3. In the art of producing a copper phthalocyanine pigment wherein a mixture of a phthalic acid derivative, urea and an inorganic copper compound is reacted under an inert atmosphere, the improvement comprising adding finely-divided silica particles to the mixture and reacting the mixture at a temperature of from 180° C. to 240° C. to form the copper phthalocyanine in situ as a coating on the silica particles, said silica being present in an amount sufficient to form a copper phthalocyanine pigment consisting by weight of from 90% to 50% silica.

4. In the art of producing a copper phthalocyanine pigment wherein a mixture of a phthalic acid derivative, urea, and an inorganic copper compound is reacted under an inert atmosphere in the presence of a catalyst for such reaction, the improvement comprising first forming a slurry of finely-divided silica with an aqueous solution containing said catalyst, drying said slurry and coating said catalyst on said silica, and thereafter, adding said catalyst coated silica to the mixture and reacting the mixture at a temperature of from 180° C. to 240° C. to form the copper phyhalocyanine in situ as a coating on the silica particles, said silica being present in an amount sufficient to form a copper phthalocyanine pigment consisting by weight of from 90% to 50% silica.

5. A process according to claim 4 wherein said catalyst coated silica is calcined at a temperature from about 300° C. to 750° C. for 1 to 2 hours prior to its addition to the mixture.

6. A process according to claim 4 wherein said formed copper phthalocyanine pigment is further treated by acid pasting, washing, drying and then disagglomerating said pigment.

References Cited by the Examiner

UNITED STATES PATENTS

| | | | |
|---|---|---|---|
| 2,173,699 | 9/1939 | Siegel. | |
| 2,452,606 | 11/1948 | Siegel | 106—289 |
| 2,578,605 | 12/1951 | Sears et al. | 106—308 |
| 2,663,650 | 12/1953 | Iler | 106—282 |
| 2,772,984 | 12/1956 | Helfaer | 106—289 |
| 2,940,830 | 6/1960 | Thornhill | 106—288 |
| 3,013,889 | 12/1961 | Stepp | 106—289 |

OTHER REFERENCES

Dahlen: "The Phthalocyanines," Ind. and Engineering Chemistry, vol. 31, No. 7, 1939, pp. 839–847.

Williams and Pitrot: "A New Pigment Concept," Ind. and Eng. Chemistry, vol. 40, No. 10, October 1948, pp. 1948–1950.

TOBIAS E. LEVOW, *Primary Examiner.*

J. E. POER, S. E. MOTT, *Assistant Examiners.*